Figure 8:
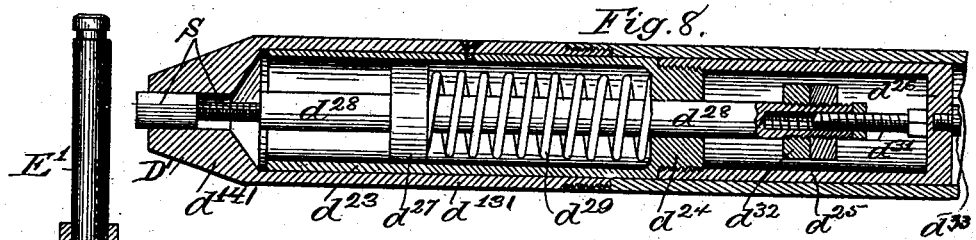

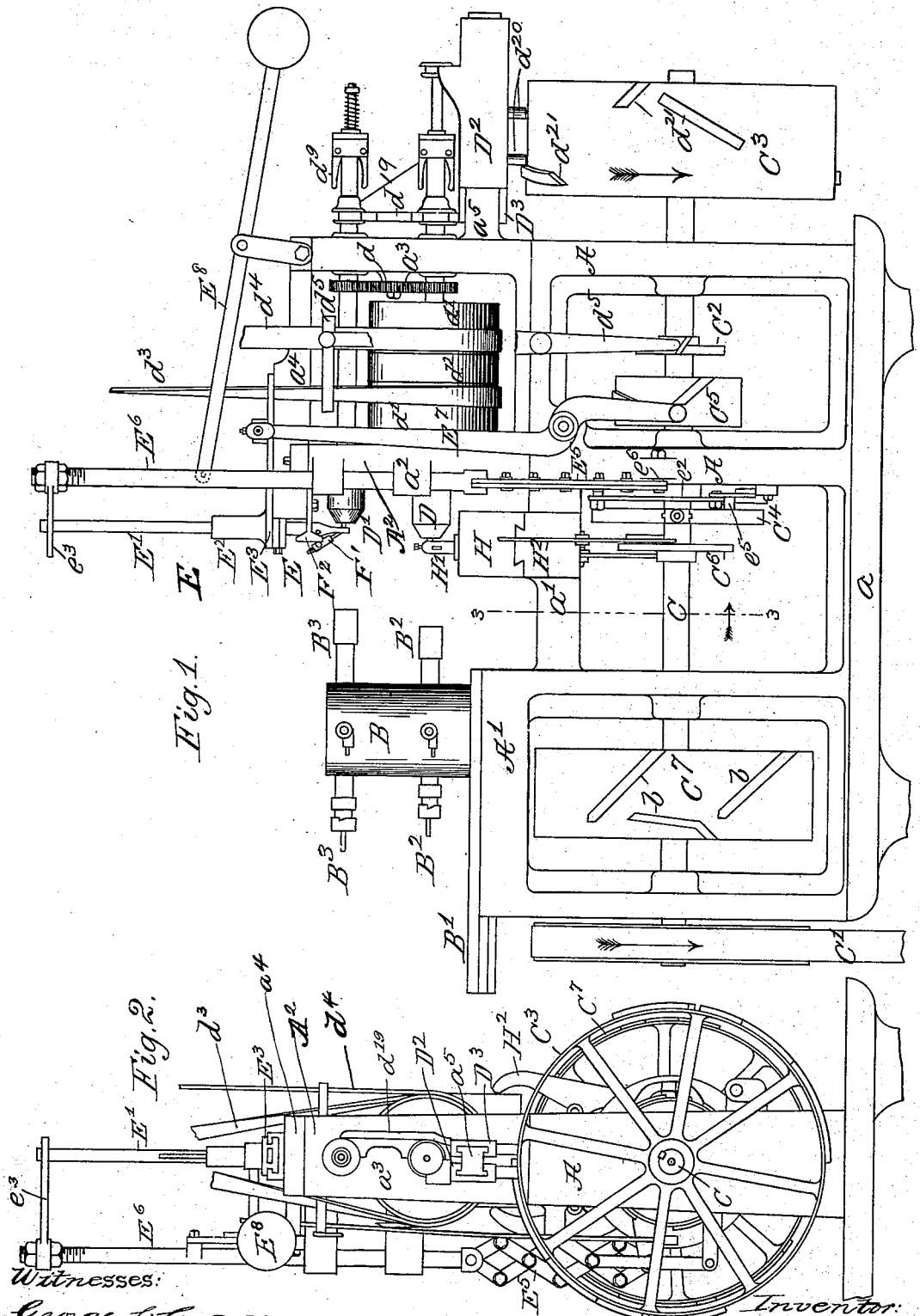

(No Model.) 4 Sheets—Sheet 2.
O. P. BRIGGS.
AUTOMATIC SCREW MACHINE.
No. 508,864. Patented Nov. 14, 1893.
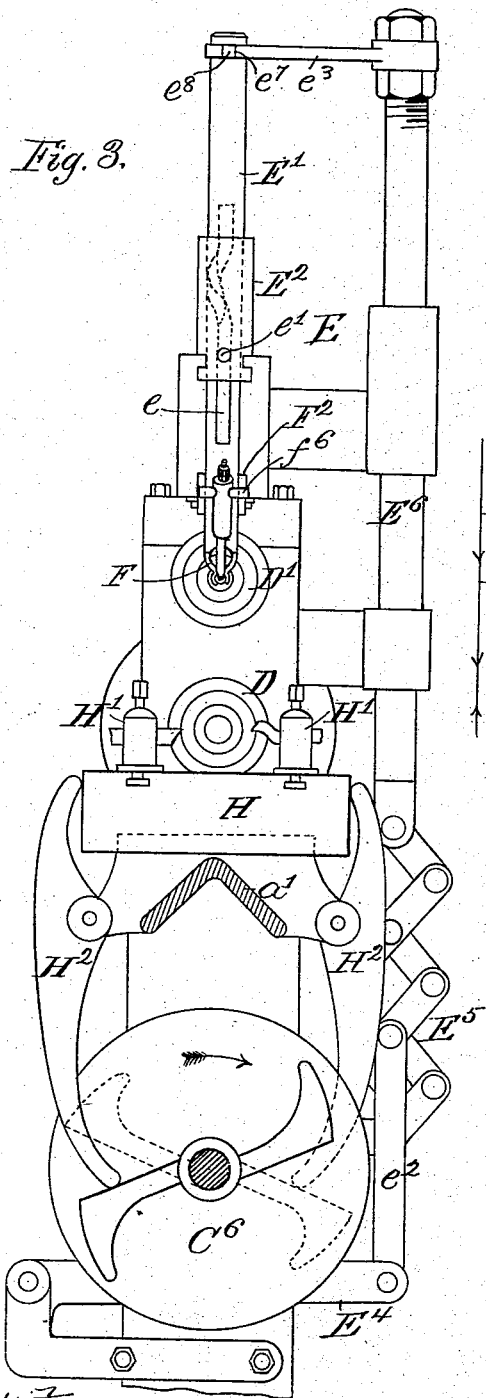
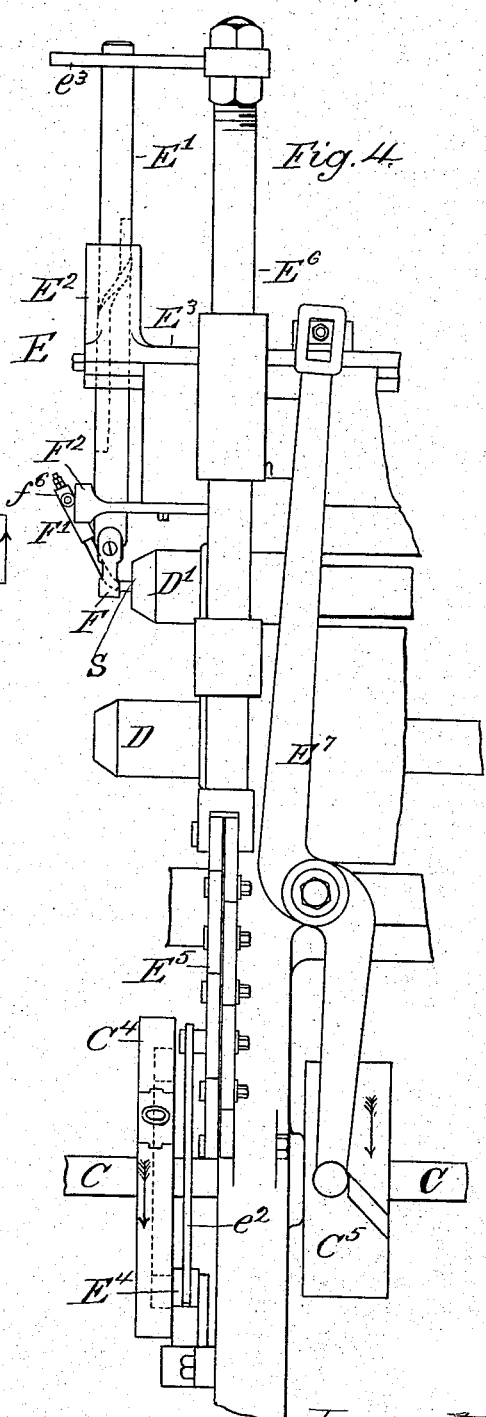
Witnesses:
George L. Cragg.
George McMahon.
Inventor:
Orlando P. Briggs
By Barton & Brown
Attys.

(No Model.) 4 Sheets—Sheet 3.

O. P. BRIGGS.
AUTOMATIC SCREW MACHINE.

No. 508,864. Patented Nov. 14, 1893.

Witnesses:
George L. Cragg.
George McMahon.

Inventor:
Orlando P. Briggs.
By Barton & Brown
Attys (No Model.) 4 Sheets—Sheet 4.
O. P. BRIGGS.
AUTOMATIC SCREW MACHINE.
No. 508,864. Patented Nov. 14, 1893.
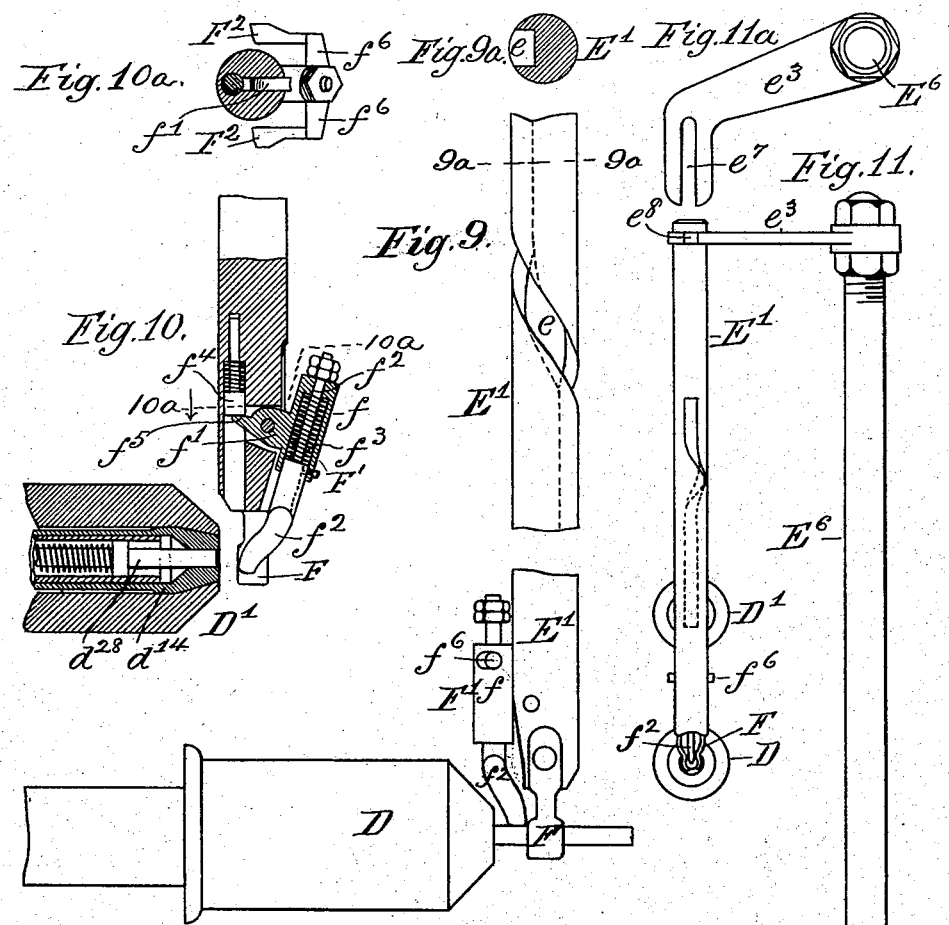
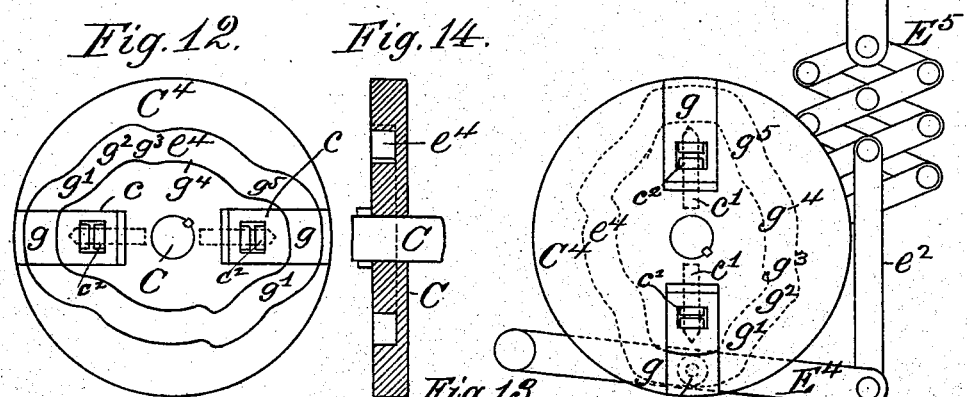
Witnesses:
George L. Cragg
George McMahon
Inventor:
Orlando P. Briggs.
By Burton & Brown
Atty's

UNITED STATES PATENT OFFICE.

ORLANDO P. BRIGGS, OF CHICAGO, ILLINOIS.

AUTOMATIC SCREW-MACHINE.

SPECIFICATION forming part of Letters Patent No. 508,864, dated November 14, 1893.

Application filed April 9, 1892. Serial No. 428,548. (No model.)

*To all whom it may concern:*

Be it known that I, ORLANDO P. BRIGGS, a citizen of the United States, residing at Chicago, in the county of Cook and State of Illinois, have invented a certain new and useful Improvement in Automatic Screw-Machines, of which the following is a full, clear, concise, and exact description, reference being had to the accompanying drawings, forming a part of this specification.

This invention relates to automatic machinery for shaping articles upon their opposite ends, such for example as metal screws, and in which such articles are twice chucked in being formed or finished and are reversed, end for end, in being carried from one chuck of the machine to the other.

A primary object of the invention is to provide an improved reversing work carrier by which the article or piece being formed is transferred from one chuck to the other and is simultaneously reversed. The improvements relating to this part of the invention concern the form of the carrying device, its movements and the devices for controlling it.

Another object of the invention is to provide an improved arrangement of the chucks and correlated parts in such a machine for the purpose of giving greater compactness and efficiency. The improvements relating to this branch of the invention involve the arrangement of the chucks one above the other, the vertical position and direction of movement of the reversing work carrier, and the provision of a double tool-holder or turret-head upon a vertical axis, one tool of the turret working upon one end of a piece in the lower chuck while another tool is finishing a similar piece in the upper chuck.

Other objects of the invention have reference to simplicity and effectiveness in the various parts and to a general improvement in the details of the machine.

In machines of this class at least two chucks are necessary, one for holding the blank or piece while being first acted upon by a suitable tool or succession of tools to form one end or part thereof, and the other holding the article after it has been transferred from the first mentioned chuck to be acted upon by another tool or set of tools to form its opposite end or part. The partially finished article is taken from the first of these chucks to the other and is reversed or turned end for end in the transfer of what I call a "reversing work carrier," and the articles in both chucks are simultaneously operated upon by suitable tools for giving to them their desired form or finish. Rotation is given the chucks by suitable means, and when the first chuck is of the "hollow-spindle" class through which a rod may be fed to supply the material from which a series of articles are to be made, a side cutter will be employed to sever the partially finished article from the rod to permit its removal to the other chuck by the reversing work carrier. The forming tools, whether in series and carried by a turret or turrets or single and carried by a plain tool-holder, require to be moved toward and from the chucks, the advancing and receding movements of the tool supports being primarily produced by cams or equivalent devices. The actuating cams, mounted upon a driving or countershaft, operate through the medium of levers or similar contrivances to give the special form of movement required in each of the several parts.

The nature of my improvements will be best understood from the following description of the accompanying drawings in which—

Figure 5:
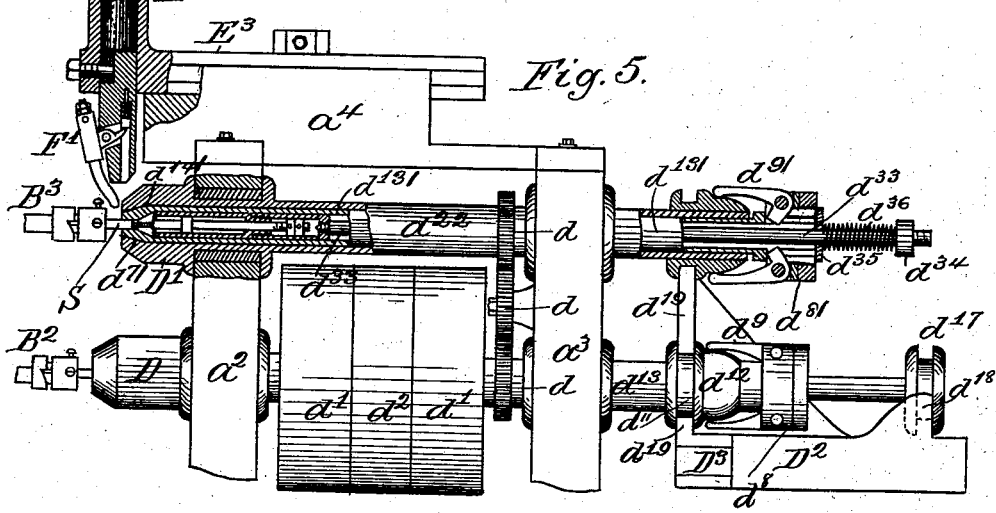
Figure 6:
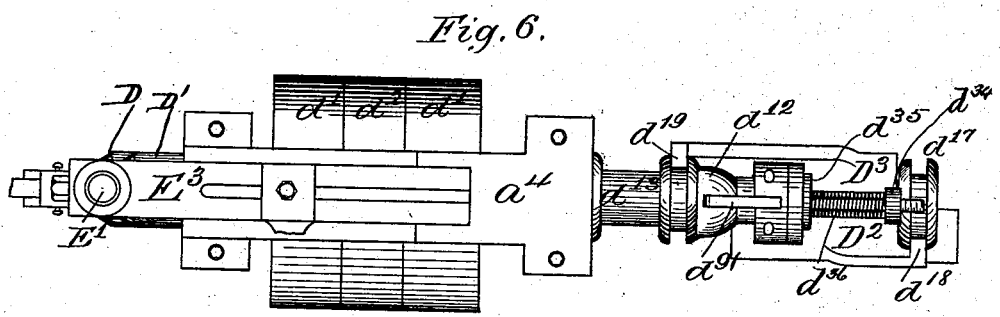
Figure 7:
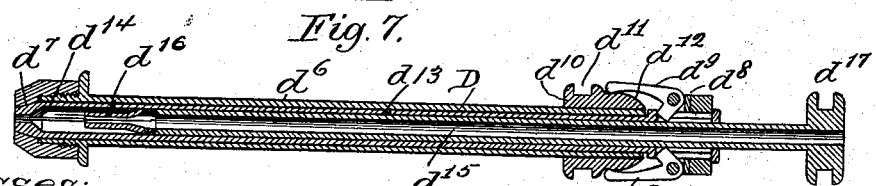

Figure 1 is a side elevation of my improved machine with the belt shifter broken away. Fig. 2 is a rear end elevation. Fig. 3 is a front elevation, enlarged, of the mechanisms seen by taking a transverse, vertical section in line 3—3 of Fig. 1 and looking in the direction of the arrow applied to said line. Fig. 4 is a side elevation on the same scale as Fig. 3, showing the principal parts seen in Fig. 3 and others adjacent thereto. Fig. 5 is a side elevation on the same scale as Figs. 3 and 4 of parts in the upper portion of the machine, certain of said parts being shown in section. Said figure also shows certain turret tools in working relation to the chucks. Fig. 6 is a top view of parts shown in Fig. 5. Fig. 7 is an axial section of the lower chuck and its spindle and other immediate connections. Fig. 8 is an axial section of the front end of the interior mechanism of the upper chuck, detached and still further enlarged. Fig. 9 is a side elevation of the lower chuck and of the work-carrier in its lowest position, both detached and on the same scale as Fig. 8. Fig. 9ª is a transverse section of the work-carrier bar in the line 9ª—9ª of Fig. 9. Fig. 10 is an axial vertical section of the front end of the upper chuck and of the work-carrier in its position for delivering work to said chuck. Fig. 10ª is a transverse section of the work-carrier in the indirect line 10ª—10ª of Fig. 10, looking downward, together with a top view of the ends of the arms for actuating the tucker. Fig. 11 is an elevation of the mechanism for raising and lowering the work-carrier. Fig. 11ª is a plan view of the connecting arm seen in side view at the top of Fig. 11. Fig. 12 is a reversed view of the wheel cam seen in Fig. 11. Fig. 13 is an edge view of said cam, and Fig. 14 is a central, transverse section thereof.

A A' represent two principal parts of a main frame and $a$ $a'$ rigid connections thereof, the part A carrying the chucking and transferring mechanisms and the part A' carrying the double turret B and its actuating devices. Extending through the entire frame is a cam shaft C driven by the belt C' from any suitable medium of power and carrying various cams that will be severally described sufficiently in connection with the several mechanisms which they respectively actuate. $A^2$ is an upward rectangular extension of the part A of the main frame, consisting of the uprights $a^2$ and $a^3$ and the transverse top beam $a^4$ arranged in the plane of the turret and cam shaft.

D and D' are chucks having parallel axes and elongated spindles, being mounted rotatively in the uprights $a^2$ $a^3$, one above the other, and geared to run together by the pinions $d$. The lower chuck spindle has mounted thereon three pulleys $d'$ $d^2$ $d'$, of which the central one, $d^2$, is fixed, and the other two are loose. By means of the two belts $d^3$ $d^4$, one of which is crossed, and a suitable belt shifter (as $d^5$, actuated by the cam $C^2$) the chucks D D' can be rotated in either direction and the direction of rotation quickly and automatically reversed.

The lower chuck D, as shown in the drawings, is hollow and adapted to give passage and forward intermittent feed to a long rod from which the articles to be made by the machine are successively cut. As shown in Fig. 7, illustrating a construction which I prefer to employ, $d^6$ is an outer tube carrying at its front end the chuck head having the tapered, axial aperture $d^7$, and at its opposite end the collar $d^8$ to which are pivoted the bent levers $d^9$, the tube $d^6$ being slotted to allow the short arms of said levers to enter it. Near the collar $d^8$ the tube $d^6$ also carries a loose conical sleeve $d^{10}$ provided with a circumferential groove $d^{11}$, the cone $d^{12}$ of the sleeve passing beneath the longer arms of the bent levers $d^9$. Within the tube $d^6$ is a second tube $d^{13}$ having at one end externally tapered spring jaws $d^{14}$, fitted to the tapered opening $d^7$ of the chuck head, and engaged at its opposite end with the inwardly directed arms of the bent levers $d^9$. A third tube $d^{15}$ is fitted loosely within the tube $d^{13}$ having the spring feeding jaws $d^{16}$ at one end and protruding at its opposite end upon which it carries the fixed, circumferentially grooved collar $d^{17}$. A movement of the conical sleeve $d^{10}$ lengthwise of the tube $d^6$ and toward the collar will obviously spread the levers $d^9$ and force the second tube $d^{13}$ into the tapering orifice $d^7$ of the chuck head, with the result of firmly grasping a rod of proper size in the spring jaws $d^{14}$, while a movement of said conical sleeve in the opposite direction will release the levers and allow the tube $d^{13}$ to recede and its jaws to relax their hold upon the rod by the spreading action of said jaws within the tapering orifice $d^7$. The spring feeding jaws $d^{16}$ upon the inner tube $d^{15}$ grasp the rod to be fed along in said tube with less force than the chuck jaws $d^{14}$ so that, when the latter have hold of the rod, the feeding jaws may be slid back on the rod preparatory to a forward feed movement thereof which is to be made when the chuck jaws are relaxed.

For the purpose of giving the desired movements to the conical sleeve and thus cause the chuck jaws to alternately seize and release the rod, and for the purpose of advancing and retracting the rod-feeding tube $d^{15}$ so as to feed the rod forward while the chuck jaws are relaxed, cam-actuated slides $D^2$ and $D^3$ are mounted on the horizontal frame arm $a^5$, the slide $D^2$ being provided with the flange $d^{18}$ entering the groove of the collar $d^{17}$, and the slide $D^3$ with the vertical arm $d^{19}$ entering the groove $d^{11}$ of the conical sleeve. These slides are also provided each with a downwardly directed pin $d^{20}$ engaging appropriately formed, arranged and timed cams $d^{21}$ on the periphery of the cam wheel $C^3$.

The upper chuck D', being intended to take a short piece transferred to it by the work-carrier from the lower chuck D, has no passage through it, and has preferably the construction indicated in Fig. 5. As there shown, $D^{22}$ is a tube carrying the head of the chuck D', said head having a tapered orifice $d^{71}$, like that of the lower chuck head. At its opposite end said tube is also provided with a fixed collar, bent levers and sliding, conical sleeve, as in the lower chuck mechanism. A second and interior tube $d^{131}$, like that of the lower chuck, is also present, having similarly tapered spring-jaws within the chuck head and similar engagement with the bent levers $d^{91}$. The arm $d^{19}$ which actuates the conical sleeve on the lower chuck spindle is extended upwardly into the groove of the conical sleeve on the upper spindle so that both chucks are closed and relaxed simultaneously. Within the tube $d^{131}$ of the upper chuck tube there is a device for discharging the finished article from the chuck, best shown in the enlarged Fig. 8 in which $d^{23}$ is a short tube fixed to the surrounding tube and having a head $d^{24}$. Upon this head is screwed another tube $d^{25}$ having a closed end $d^{26}$. In the tube $d^{23}$ is fitted a sliding head $d^{27}$ secured upon an axial rod $d^{28}$ which extends through the head $d^{24}$ of the tube and to near the closed end $d^{26}$ of the tube $d^{25}$. Between the fixed head $d^{24}$ and the sliding head $d^{27}$ is placed an expanding coiled spring $d^{29}$. That end of the rod which is adjacent to the chuck jaws is adapted to enter the orifice within said jaws so as to push out the finished article when released. At its opposite end, said rod is provided with the axially arranged, adjusting screw $d^{31}$ which bears against the closed end $d^{26}$ of the tube $d^{25}$ to limit its rearward movement, and it is also provided with the adjustable collar $d^{32}$ which strikes the head $d^{24}$ to limit the outward or discharging movement of the rod produced by the spring $d^{29}$. The article to be operated upon in the upper chuck (shown as a screw at S in Figs. 5 and 8) in being pushed into the chuck bears against the end of the rod $d^{28}$ so as to give the desired compression to the spring $d^{29}$ for the purpose of subsequently expelling said article after being finished, while the adjusting screw $d^{31}$ limits the distance to which the article may be inserted into the chuck. To the end $d^{26}$ of the tube $d^{25}$ is attached a rod $d^{33}$ which projects beyond the collar $d^{31}$ and is provided with a nut $d^{34}$ (Figs. 5 and 6). Between this nut and a plate $d^{35}$ (which bears against the end of the tube $d^{22}$) is applied an expanding coiled spring $d^{36}$ the tendency of which is to retract the tubes $d^{23}$ and $d^{25}$ and, with them, the attached surrounding tube $d^{131}$ with its spring jaws $d^{141}$. By reason of the continuous engagement of the conical slides of both chuck spindles with the arm $d^{19}$ of the horizontal slide $D^3$, the jaws of both chucks are simultaneously contracted and simultaneously relaxed.

E represents a work-carrier mechanism for transferring a blank or piece that has been partly finished in the lower chuck to the upper chuck and for reversing said piece, end for end, in so transferring it. Said mechanism embraces, for its primary element, a vertically sliding and half rotating bar E', provided with a gripping device F, composed of a pair of spring jaws, at its lower end. As here constructed said bar E' is given its half rotation in one direction in the course of its upward movement and in the other direction in the course of its downward movement, by means of a lengthwise groove $e$ therein, which groove, at its middle portion, is given a spiral course from one side to the other of the bar, said groove being engaged by a roller pin $e'$ that protrudes into the orifice of the hub $E^2$ in which the bar is fitted to reciprocate vertically. The hub $E^2$ is here shown as being mounted upon a horizontal slide $E^3$ by which a lateral, bodily movement is also given to the carrier bar. Such lateral movement is, however, not in all cases necessary. In addition to the gripper F the carrier bar is also provided with a tucker F' for thrusting the piece of work from the gripper jaws into the upper chuck D'. The details of the tucker as preferably constructed are best shown in Fig. 10, wherein it is composed of a tubular body $f$ having a side lug $f'$ by which it is pivoted to the carrier bar, and a finger proper $f^2$ which is longitudinally movable in the body. To provide for such lengthwise movement of the finger $f^2$ it is shown as having a shank which passes through the upper closed end of the body and has fitted thereon an external nut, said shank being surrounded within the body by an expanding coiled spring $f^3$. The finger of the tucker F' is vibrated outwardly and normally held in its outer position by a spring presser $f^4$ arranged in the carrier bar and acting upon a projection $f^5$ at the inner end of the lug $f'$. Said tucker finger is vibrated inwardly toward the chuck to push the partly finished piece from the grippers F into the latter, by means of an arm or arms $F^2$ arranged to strike against a lateral projection or projections $f^6$ on the tucker above its pivot. In the construction shown, in which the carrier bar is given a lateral movement toward the chuck D', said arm or arms $F^2$ are stationary or fixed, but in the absence of an appropriate sidewise movement of the carrier-bar the arm or arms $F^2$ or their equivalent may themselves be given a suitable movement to give the desired tucking action to the tucker.

Vertical movement is given the carrier-bar E' by the grooved wheel cam $C^4$, acting through the media of a lever $E^4$, connecting bar $e^2$, lazy-tongs $E^5$, sliding rod $E^6$ and connecting arm $e^3$. The wheel $C^4$ has the cam groove $e^4$ in its side face formed and timed appropriately to give the motions and rests desired, and into said groove projects a pin $e^5$ from the lever $E^4$. Said lever is connected by the bar $e^2$ with an intermediate joint of the lazy-tongs, the lower joint of the latter being fixed to the machine frame (as seen at $e^6$, Fig. 1) and its upper joint connected with the lower end of the sliding rod $E^6$. The connecting bar $e^3$, as will be seen from Figs. 3, 11 and 11$^a$, has a slot $e^7$ therein, fitted to the cylindric neck $e^8$ on the work-carrier bar E', said slot being arranged lengthwise of the slide $E^3$ which gives lateral motion to the carrier-bar. To facilitate the lifting of the carrier-bar through the medium of the cam and lazy-tongs, the counterweighted lever $E^8$ is fulcrumed on the frame and connected with sliding bar $E^6$. The advantage of the lazy-tongs is obviously to give a desirably long movement of the carrier-bar by a cam of small diameter. The slide $E^3$ is reciprocated by the peripheral wheel-cam $C^5$ through the medium of the lever $E^7$, Figs. 1 and 4.

As the movements of the carrier-bar may be varied, so may the details of the cams $C^4$ and $C^5$ be correspondingly varied. As the machine is herein shown the lower chuck D is made to project farther forward than the upper chuck to favor a somewhat simpler order of movements on the part of the work-carrier, and, in the present instance, the movements and rests of said carrier are as follows, making reference, in describing them, to Figs. 3, 4, 5 and 9. In Figs. 3 and 4 the work-carrier is seen to be so far elevated as to bring the work-holding point of the gripper F exactly opposite the orifice in the upper chuck D' and is also seen to have been moved back laterally into proximity with the chuck. In this lateral movement of the carrier, the fixed arms $F^2$ have tilted the tucker F' and the latter has forced the piece of metal, S, out of the gripper F and into the chuck. From this point the carrier-bar rises vertically to a point high enough above the chuck to allow the operating tool or tools to work upon the protruding end of the piece S, as shown in Fig. 5, and it remains in this more elevated position till said tools have finished the article and have been retracted therefrom. Thence the carrier-bar is moved horizontally in the opposite direction or forwardly and away from the chuck by action of the slide $E^3$ and it then descends vertically and forces the gripper jaws over the partly finished end of the rod protruding from the lower chuck, as shown in Fig. 9, said rod being still unsevered. In such descent the carrier-bar has been rotated half a turn, bringing the tucker between the bar and the chuck and over the protruding rod. Striking upon the latter, the tucker finger $f^2$ is forced upwardly into the tube $f$ against the resistance of the spring $f^3$, as also shown in Fig. 9. Here the carrier remains at rest while a side cutter severs the piece held by the gripper from the rod; and, this done, the carrier commences its ascent toward the upper chuck. In this ascending movement, the tucker finger resumes its proper extension and presents its end opposite the end of the piece within the gripper. In this ascent, also, the carrier-bar is half rotated, bringing the finished end of the piece S inward toward the chucks. When the said piece S arrives at a point opposite the orifice of the chuck D' the carrier ceases to rise and it makes its horizontal movement toward the chuck, the tucker, in the course of this movement, striking the arms $F^2$ and pushing the piece clear of the gripper jaws and to a proper distance into the chuck D'.

As already stated, the exact movements here contemplated need not in all cases be given the work-carrier, and in some instances it will be necessary to vary them, as, for example, when the pieces transferred are of considerable length. In that case both an outward and an upward movement of the carrier may be required, on leaving the lower chuck, in order to obtain room to reverse the piece and insert it into the upper chuck.

As the cam wheel $C^4$ is shown in the drawings (Figs. 11 and 12) it causes two double reciprocations of the carrier in each rotation of the wheel. Each of the concentric parts $g$ of the groove, most remote from the wheel center, gives the rest of the carrier at its lowermost position or while opposite the lower chuck; the part $g'$ gives the ascent of the carrier to the level of the upper chuck; the short, concentric part $g^2$ retains the carrier at this elevation while the work is being inserted into said upper chuck; the succeeding inwardly directed part $g^3$ causes the final ascending movement of the carrier, and the longer concentric part $g^4$ retains the carrier at this elevation while the operating tools are at work. Finally the part $g^5$ of the groove produces the descent of the work carrier to the level of the lower chuck. In order to enable the throw of the cam to bring the gripper exactly opposite the axes of both chucks, the portions $g$ of the groove $e^4$ are formed in radially adjustable blocks c c. The adjusting devices for these blocks may be of any preferred form, such devices, as shown, consisting of radial screws c' fixed in the body of the wheel and provided each with two nuts $c^2$ set in a recess of the block which it adjusts.

H is a transverse slide, carrying one or more adjustable tool posts H', for side cutting tools employed either in severing a partly finished piece from a rod, or in doing the whole or a part of the work upon one end of said piece. The slide H is reciprocated by the cam $C^6$ operating through levers $H^2$ or similar media, in a manner obvious from inspection of Fig. 3.

The rotative turret B is mounted on a slide B' arranged in the plane of the chucks and giving movement to the turret toward and from the chucks by engagement of a roller pin depending from said slide with cams $b$ on the periphery of the wheel $C^7$. The partial rotations of the turret are made upon its retraction by familiar ratchet and pawl devices, not shown. The turret is provided with two sets of tool holders $B^2$ and $B^3$ arranged respectively in the horizontal planes of the chucks D and D' so that work is simultaneously done upon pieces or articles in both said chucks.

I have not claimed herein the combination with the two spindles of the cam mechanism adapted to simultaneously actuate the chucking devices thereof, as this forms the subject matter of another application, Serial No. 434,101, filed May 23, 1892.

I claim as my invention—

1. In combination with two parallel chucks, a reversing carrier consisting of a bar provided with means for grasping the article being formed and arranged in the plane of the chucks, and mechanism whereby said bar is given a simultaneous lengthwise and half rotative movement in the passage of its grasping device from a point in front of one chuck to a point in front of the other.

2. In combination with two parallel chucks arranged one above the other, a reversing work-carrier consisting of a bar provided at its lower end with a gripper for grasping the article being formed, said bar being arranged in the plane of the chucks and mechanism for imparting to said bar the following movements, to wit: a downward and half rotative movement carrying its gripper from above the upper chuck to a point opposite the lower chuck, to take the partially made article; an upward and half rotative movement to bring the article in its reversed position opposite the upper chuck; and a further and separate upward movement to carry the gripper out of the way of the forming tools, substantially as described.

3. The combination with two chucks, of a reversing work-carrier, a tucker mounted on the work-carrier, and means for operating the tucker.

4. In combination with two parallel chucks, a reversing work-carrier consisting essentially of a lengthwise sliding bar provided with a gripper and having a suitably engaged spiral by which the bar is half rotated in its lengthwise sliding movement.

5. In combination with two parallel chucks, a slide having movement parallel with the axes of the chucks, and a reversing work-carrier mounted in said slide in the plane of the chucks, and mechanism whereby said work-carrier is given both a lengthwise and a half rotative movement in said slide, and a bodily lateral movement with the slide, substantially as and for the purposes set forth.

6. In combination with two parallel chucks, a reversing work-carrier having a lengthwise and half rotative movement in carrying the work from one of the chucks to the other, a slide carrying the work-carrier and moving parallel with the axes of the chucks, a tucking lever pivoted to the work-carrier, a spring normally holding the tucking end of the lever retracted and a part engaging the tucking lever and tilting it as the work-carrier moves with the slide toward the adjacent chuck.

7. The combination of two parallel chucks arranged one above the other, a double tool holder movable toward and from the chucks in the plane of said chucks, a reversing work-carrier consisting of a vertically sliding and half rotating bar provided with a gripper for grasping the article being formed, and a tucker on the work-carrier for thrusting the article from the carrier into the uppermost chuck.

8. The combination of two parallel chucks arranged one above the other, a reversing work-carrier for transferring an article from the lower to the upper chuck, and a turret tool-holder having a vertical axis of rotation and horizontal bodily movement toward and from the chucks, said turret being provided with two sets of tool-holding devices of which one set is in the plane of the upper chuck, and the other is in the plane of the lower chuck, substantially as described.

9. In an automatic screw machine, the combination with two parallel chucks placed one in advance of the other, of a reversing work-carrier for transferring a partly finished piece from the advanced chuck to the other of said chucks, said work-carrier being capable of two movements, the one parallel and the other perpendicular to the axes of said chucks, substantially as described.

10. In combination with a hollow, through-feed chuck and a second chuck arranged parallel therewith, both said chucks being provided with interior, longitudinal, movable, jaw-carrying parts, devices for relaxing the jaws and levers and lever-actuating conical slides for closing the jaws, substantially as shown, and a movable part or slide engaged with both said conical slides, whereby the jaws of both chucks are simultaneously opened and closed.

11. In combination with the two chucks and the reversing work-carrier, a tucker pivoted to the carrier and consisting of the spring-connected parts $f f'$, a spring arranged to retract the tucker and means for advancing the tucker opposite the upper chuck.

12. In combination with the chucks and the reciprocatory and semi-rotary work-carrying bar, a rotary cam, and mechanism intermediate to the cam and carrier bar, comprising a lazy-tongs, whereby a relatively long movement is given the carrier bar from a relatively short throw of the cam.

13. In an automatic screw machine the combination of two parallel chucks arranged one above the other, a reversing work-carrier having a vertical movement in the plane of the chucks, a transverse tool-carrying slide arranged below the lower chuck, a tool-turret having a vertical axis in the plane of the chucks and provided with tool-holders opposite both chucks, a horizontal slide carrying the turret and movable in the plane of the chucks, a shaft beneath these mechanisms provided with cams and suitable intermediate devices whereby the cams impart the desired movements in their proper order to the said mechanisms.

14. In a screw machine, the combination with a pair of chucks occupying parallel positions, of a work-carrier adapted to travel from one of said chucks to the other, a cam adapted to impart motion to said work-carrier and lazy-tongs interposed between said cam and said work-carrier, whereby the throw of said cam may be less than the movement of said work-carrier, substantially as described.

In witness whereof I hereunto subscribe my name this 3d day of March, A. D. 1892.

ORLANDO P. BRIGGS.

Witnesses:
GEORGE P. BARTON,
GEORGE L. CRAGG.